United States Patent [19]

Murakami et al.

[11] Patent Number: 4,848,496
[45] Date of Patent: Jul. 18, 1989

[54] COORDINATES INPUT APPARATUS

[75] Inventors: Azuma Murakami; Teruyoshi Hagiwara; Yoichi Tuchida; Hideki Johno, all of Saitama, Japan

[73] Assignee: Wacom Co., Ltd., Saitama, Japan

[21] Appl. No.: 206,404

[22] Filed: Jun. 14, 1988

[30] Foreign Application Priority Data

Jun. 16, 1987 [JP] Japan .................................. 61-148055

[51] Int. Cl.⁴ ............................................. G08C 21/00
[52] U.S. Cl. ...................................................... 178/19
[58] Field of Search ...................... 178/19, 18; 364/520, 364/709; 340/706-708

[56] References Cited

U.S. PATENT DOCUMENTS 4,709,209 11/1987 Murakami et al. ................ 178/18

Primary Examiner—Stafford D. Schreyer
Attorney, Agent, or Firm—Pollock, VandeSande & Priddy

[57] ABSTRACT

A coordinates input apparatus has a tablet including X- and Y-direction position detecting portions having a multiplicity of loop coils arranged in parallel with one another in X- and Y-directions, respectively, the X- and Y-direction position detecting portions being superposed one on the other. The apparatus also has a position appointing device incorporating a tuning circuit capable of making resonance with electric wave produced from one of the loop coils. The loop coils are successively selected in a one-by-one fashion and an A.C. signal of a predetermined frequency is supplied to the thus selected loop coil. The electric wave causes a tuning of the tuning circuit in the position appointing device so that a voltage of a frequency substantially the same as the above-mentioned predetermined frequency is generated in the loop coil which is near the position appointing device. The position appointed by the position appointing device is therefore detected by sensing the induced voltage of a frequency substantially equal to the predetermined frequency of the A.C. voltage, through a processing by a suitable processing device. Since the position appointing device need not be connected to any stationary portion of the apparatus, the coordinates data can be input with a high degree of maneuverability and with a distinguished precision. It is also possible to display the data input through the position appointing device or the data transmitted thereto through a transmission line.

3 Claims, 9 Drawing Sheets

COORDINATES INPUT APPARATUS

BACKGROUND OF THE INVENTION

1. Field of the Invention

The present invention relates to a coordinates input device including a position appointing device having a superior maneuverability and capable of in putting coordinates data with a high degree of precision. More particularly, the present invention is concerned with a coordinates input apparatus capable of transmitting hand-written characters and patterns through, for example, a telephone network and capable of displaying characters and patterns which have been transmitted thereto.

2. Description of the Prior Art and its Problems

A coordinates input apparatus has heretofore been known having a magnetostrictive transmission medium, a position appointing device, a driving coil provided on one end of the magnetostrictive transmission medium or the pointing end of the position appointing device, and a detection coil provided on the pointing end of the position appointing device or one end of the magnetostrictive transmission medium, wherein a pulse current is supplied to the driving coil so as to generate a magnetostrictive vibration wave in the magnetostrictive transmission medium and the vibration wave propagating through the magnetostrictive transmission medium induces a voltage in the detection coil, whereby the position of the position appointing device is determined through processing the time interval between the application of the driving pulse current and the detection of the induced voltage by a suitable processing means.

In another known coordinates input apparatus, a plurality of driving lines and a plurality of detection lines are arranged orthogonally to each other thus forming a matrix. In operation, a position is detected by a position appointing apparatus having a magnetic member such as a ferrite, and driving current is supplied to the successive driving lines while the successive detection lines are scanned, whereby the appointed position is determined as the position on the detection line in which a specifically high voltage is induced.

The position detection apparatus of the first mentioned type exhibits a considerably high degree of position detection but undesirably requires a cord for exchange of timing signals between the position appointing device and the processing device and other portions of the apparatus. In consequence, the handling is undesirably restricted due to the presence of the cord. In addition, it is necessary that the position appointing device be held perpendicularly to the magnetostrictive transmission medium and in close proximity to the magnetostrictive transmission medium.

The second type of the apparatus is advantageous in that it can provide a cordless construction. Unfortunately, however, the resolution is determined by the pitch of the lines. For attaining a high resolution, it is necessary that the pitch of the lines be reduced. A smaller pitch of the lines, however, impairs the S/N ratio and the stability, so that a difficulty is encountered in the improvement in resolution. In addition, it is generally difficult to detect the positions right above the crossing points of the driving lines and the detection lines. It is also to be pointed out that the position appointing device has to be placed in the very close proximity of the lines. It has also been known to transmit pattern data through, for example, telephone networks. In such a case, the pattern data is transmitted either in the form of analog data through facsimile or after conversion into predetermined digital data through an image scanner and a personal computer, in the form of modulation/demodulation circuit (MODEM).

The facsimile and the image scanner, however, can read only the characters and patterns drawn or printed on a sheet, and there is no means for directly transmitting the hand-written letters and patterns or for deleting or correcting the content of the data. In addition, an impractically long time is required for the reading of the data.

SUMMARY OF THE INVENTION

Accordingly, an object of the present invention is to provide coordinate input apparatus which incorporates a position appointing device having superior maneuverability and capable of inputting coordinates data with a high degree of precision, and which is capable of transmitting hand-written letters and patterns through a telephone network and displaying letters and patterns which have been transmitted thereto.

To this end, according to the present invention, there is provided a coordinates input apparatus comprising: a tablet including an X-position detecting portion having a multiplicity of loop coils arranged in parallel so as to extend in X-direction and a Y-position detecting portion having a multiplicity of loop coils arranged in parallel so as to extend in Y-direction, the X-position detecting portion and the Y-position detecting portion being superposed one on the other; a display unit; a position appointing device having a tuning circuit including a coil and capacitors so as to make resonance at a predetermined frequency; a position detecting circuit including X- and Y-direction selection means for successively selecting one from the X-direction loop coils and Y-direction loop coils, respectively, transmission means for driving, with an A.C. signal of the predetermined frequency, the selected X- and Y-direction loop coils, receiving means for detecting, from among a plurality of voltages induced in the selected X-direction and Y-direction loop coils, an induction voltage of a frequency substantially the same as the predetermined frequency, X- and Y-transmission/receiving changeover means for connecting each of the selected X- and Y-direction loop coils alternately to the transmission means and the receiving means, and control means for determining, from the induction voltages induced in the X- and Y-direction loop coils, the position appointed by the position appointing device in X- and Y-directions; a display control circuit for driving the display unit; and a modulation/demodulation circuit for converting data such as coordinates values of the appointed position and transmitting the converted data through a transmission line and for conducting an inverse conversion of the signals transmitted through the transmission line.

In operation, electric wave is exchanged between one of a multiplicity of X- or Y-loop coils of the tablet and the tuning circuit in the position appointing apparatus, and this signal exchange is performed with all of the multiplicity of X- and Y-loop coils. In consequence, the coordinate values of the appointed position in X- and Y-directions are determined from the analysis of the induced voltages. The thus determined coordinate values and data on the basis of the thus determined coordinate values are displayed on a display unit or, alternatively, converted into a transmission signal by a modulation/demodulation circuit and transmitted to other devices.

It is therefore possible to input, with a high degree of precision, any desired letters and patterns simply by manipulating the position appointing device on the tablet. In addition, the position appointing device is required only to have a tuning circuit which is mainly constituted by a coil and capacitors. Thus, the necessity for any cord is eliminated, as well as heavy parts such as batteries and magnet, and the maneuverability of the input device can remarkably be improved. Furthermore, the operator can confirm the hand-written letters and patterns visually on the display and the input data can be transmitted to another device through, for example, a telephone network. The apparatus also can display the hand-written letters and patterns transmitted from another similar apparatus, thus enabling a prompt processing of position data. In addition, it is possible to design a tablet having a large size because it is not necessary to employ any specific part. Furthermore, the precision of position detection can be improved by enhancing the precision of arithmetic operation on the detected induction voltage.

A second object of the present invention is to provide a coordinates input apparatus incorporating a display unit having the same size as the tablet and superposed on the tablet. According to this coordinate input apparatus, it is possible to input the coordinate data of the letters and patterns to the tablet across or through the display unit, while visually checking the result of the input on the coordinates of the display. It is therefore possible to conduct the input of the data with a high degree of precision.

A third object of the present invention is to provide a coordinates input apparatus having a display unit smaller than the tablet and superposed on the portion of the tablet other than the input region of the tablet. According to this arrangement, the operator can input the coordinates data of letters and patterns while confirming the result of the input through the display unit which is provided on a portion of the tablet other than the input region thereof, thus attaining a high degree of precision of the input operation. In addition, diversification of the input work such as input with reference to the reference data displayed on the display unit can be realized.

Other objects, features and advantages of the present invention will become clear from the following description of the preferred embodiments when the same is read in conjunction with the accompanying drawings.

BRIEF DESCRIPTION OF THE PREFERRED DRAWINGS

Figure 7:
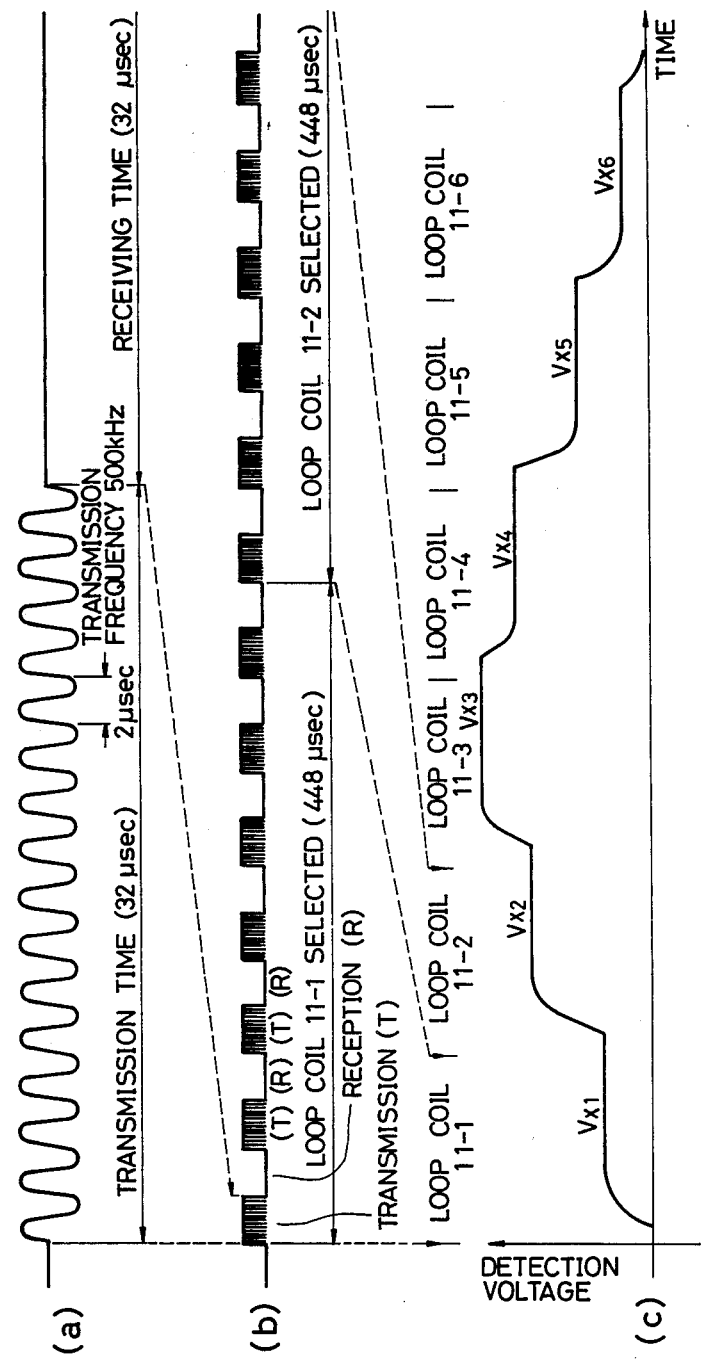
Figure 8:
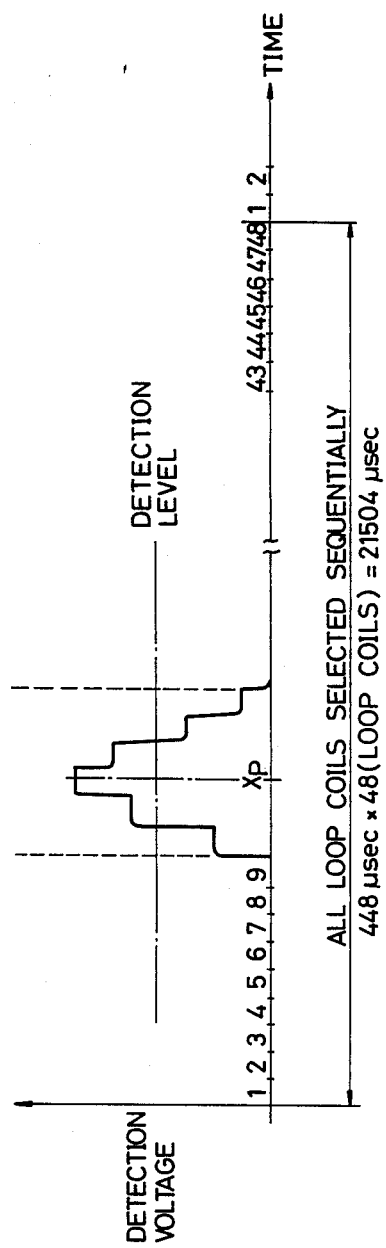

FIGS. 7(a), 7(b) and 7(c) are timing charts illustrating basic position detecting operation in the position detection circuit;

FIG. 8 is an illustration of the voltage detected from loop coils; and

Figure 9:
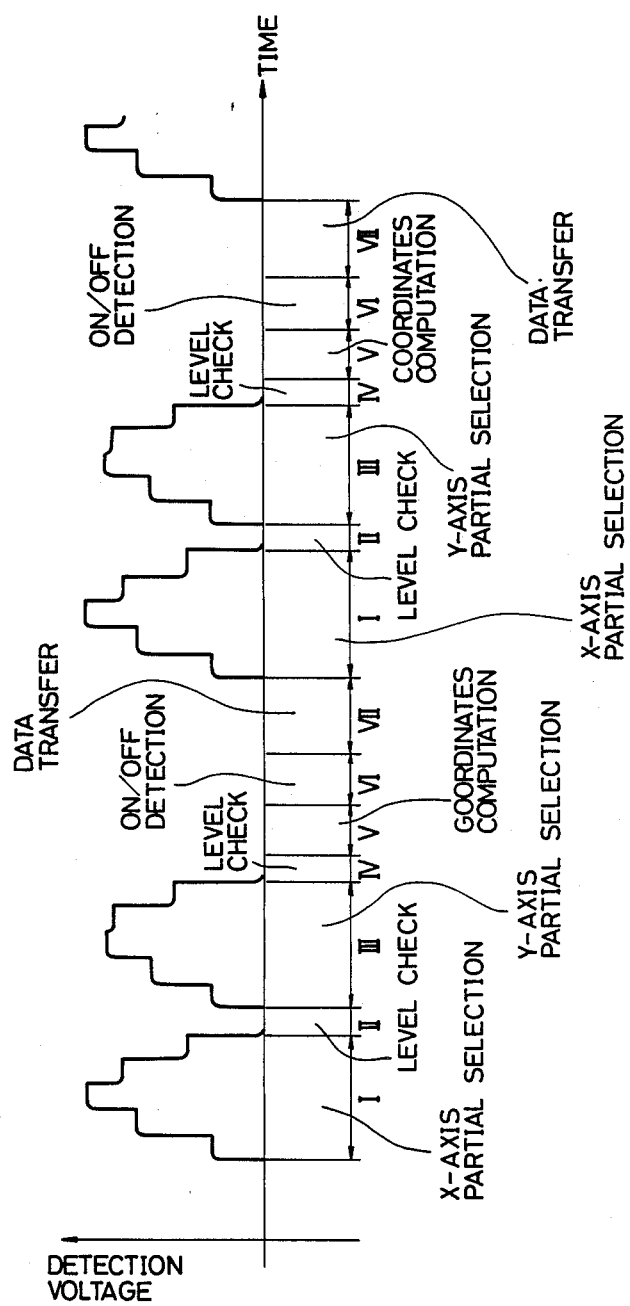

FIG. 9 is a timing chart illustrating the operation of the position detection and the operation of discrimination of states in the second and subsequent detection cycles.

DETAILED DESCRIPTION OF THE PREFERRED EMBODIMENTS

Figure 1:
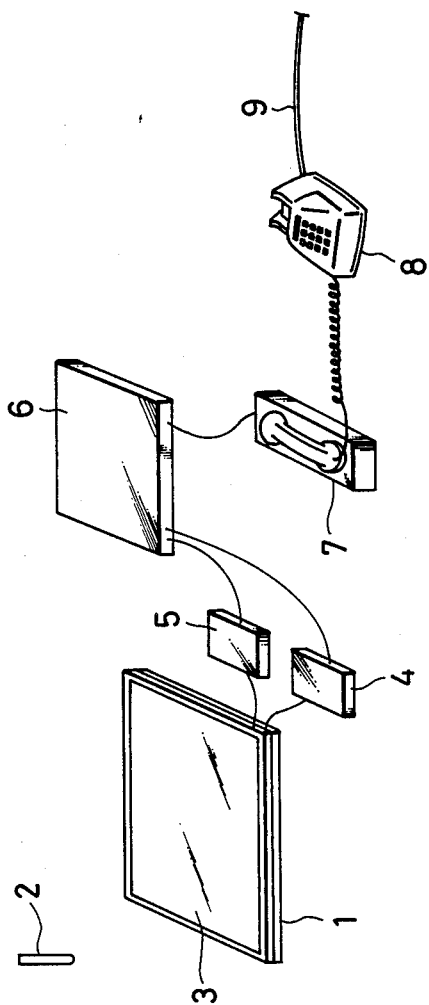
FIG. 1 is a perspective view illustrating the outline of the coordinate input apparatus of the present invention.

Referring first to FIG. 1 which illustrates the outline of the coordinates input apparatus of the present invention, the apparatus has a tablet 1 for receiving input coordinates data, a position appointing device 2 for appointing a position on the tablet, e.g., a stylus pen, a flat planar display 3 superposed on the tablet 1, a position detection circuit 4 for detecting the coordinate values of the position appointed on the tablet 1 by the stylus pen, a control circuit 5 for driving the display 3, a processing unit 6, and a modulation and demodulation circuit 7 for converting the data signal into transmission signals and inverse conversion, e.g., an acoustic coupler. Also included are a telephone 8, and a telephone network 9.

Figure 2:
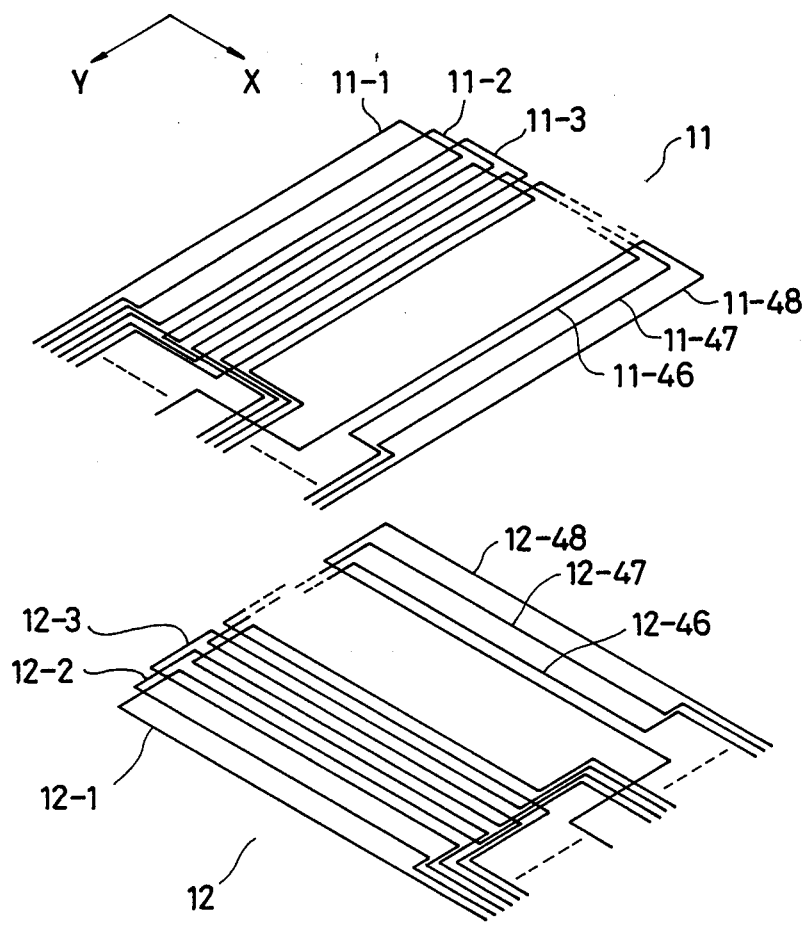
FIG. 2 is an illustration of the detail of the position detecting portion of the tablet for determining the position in X- and Y-directions.

FIG. 2 illustrates the detail of the X-direction position detecting portion 11 and a Y-direction position detecting portion 12 for determining the appointed position in the X- and Y-directions, the position detecting means 11 and 12 constituting the tablet 1.

The X-direction position detecting portion 11 is constituted by a multiplicity of, e.g., 48, loop coils 11-1, 11-2, . . . ., 11-48 which extend in the X-direction in parallel with one another and which are arranged such that adjacent loop coils are partially superposed one on the other. Similarly, the Y-direction position detecting portion is constituted by a multiplicity of, e.g., 48, loop coils 12-1, 12-2, . . . ., 12-48 which extend in the Y-direction in parallel with one another and which are arranged such that the adjacent loop coils are partially superposed one on the other. The X-direction position detecting portion 11 and the Y-direction position detecting portion 12 are superposed one on the other in close contact with each other, although both position detecting means are illustrated as being separated from each other for the purpose of clarification. The X-direction and Y-direction position detecting means are encased in a case made of a metallic material.

Although in the illustrated embodiment each loop coil is constituted by a single turn, the loop coil may have a plurality of turns. The position detecting portions can be obtained by forming a multiplicity of parallel grooves by etching in a printed board which is known per se and connecting them by jumper lines, thus completing a multiplicity of loop coils.

Figure 3:
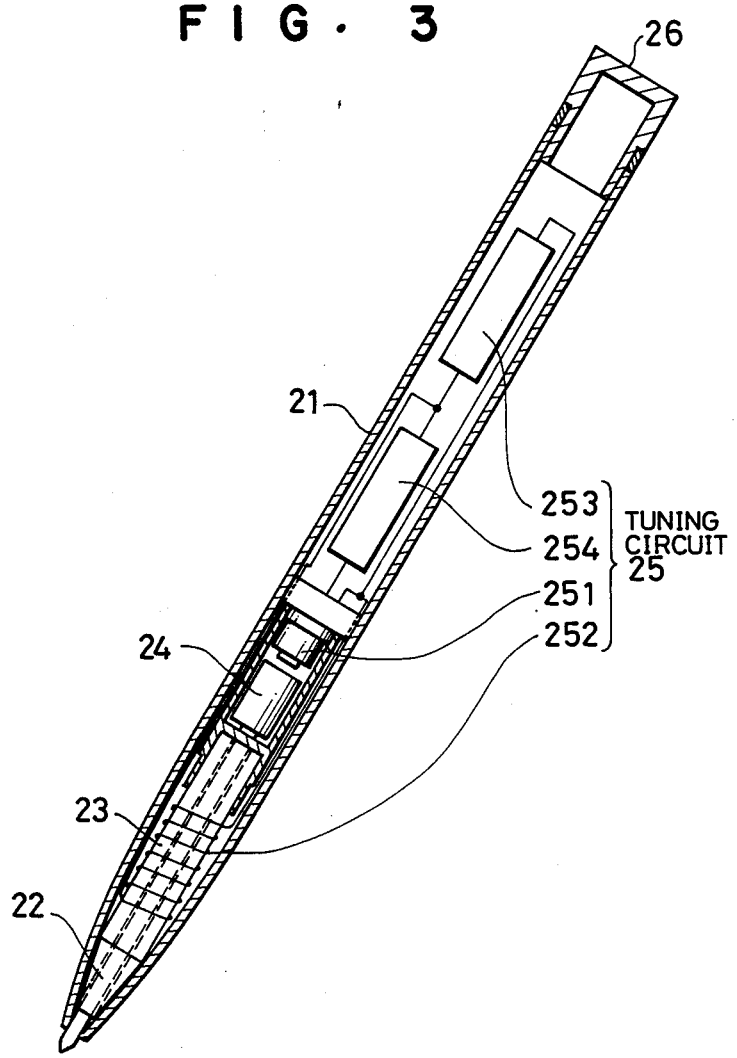
FIG. 3 is a sectional view of a stylus pen.

FIG. 3 is an illustration of the detail of the construction of a stylus pen (referred to simply as "pen" hereinunder) 2. The pen 2 has a shaft or stem 21 made from a non-metallic material such as plastic. The stem 21 integrally receives various parts including a core 22 such as a ball point pen, a ferrite core having a bore which slidably receives the core 22, a coiled spring 24, a switch 251, a coil 252 wound around the ferrite core 23, and a tuning circuit 25 constituted by a coil 252 and capacitors 253 and 254. A cap 26 is attached to the rear end of the pen 2.

Figure 4:
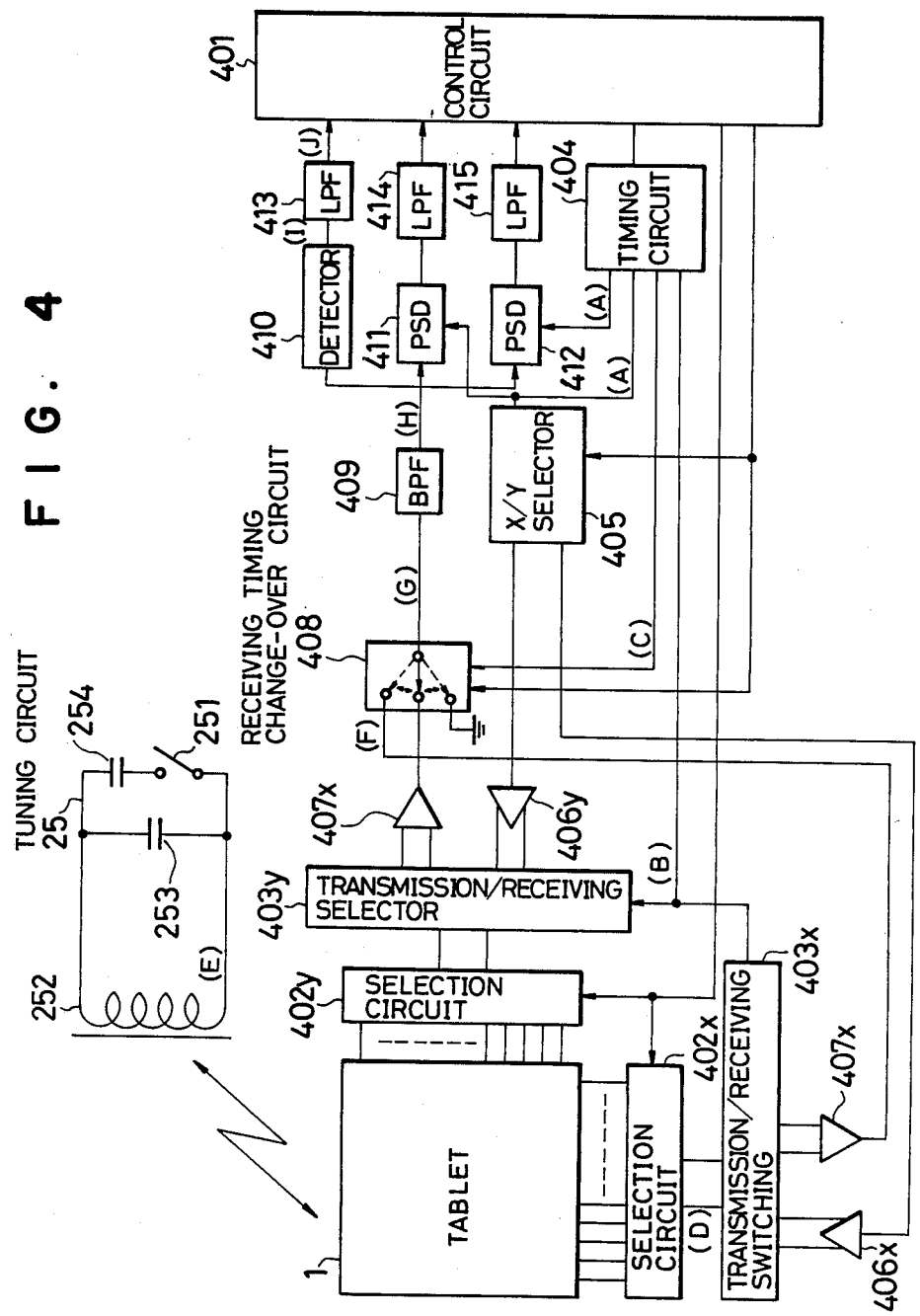
FIG. 4 is an illustration of the detail of the tuning circuit and the position detection circuit of the stylus pen.

As will be seen from FIG. 4, the coil 252 and the capacitor 253 are connected in series as shown in FIG. 4 so as to constitute a resonance circuit which is known per se. The numerical values of the inductance of the coil 252 and the capacitance of the capacitor 253 are so determined that a resonance (tuning) takes place in the synchronized state of the voltage and current at a predetermined frequency $f_0$. The capacitor 254 is connected to both ends of the capacitor 253 through a switch 251. When the switch 251 is turned on, the phase of the current in the above-mentioned resonance circuit is delayed and the phase of a later-mentioned reception signal is delayed by a predetermined angle. In the use of the position appointing device, the user grips the pen 2 at the stem portion 21 and presses the end of the core 22 onto the surface of the display unit 3. As a result, the rear end of the core 22 acts to compress the coiled spring 24, whereby the switch 251 is turned on. The display unit 3 may be a display panel which has a known matrix-type liquid crystal display element composed of a plurality of horizontal and vertical electrodes which are arranged orthogonally, a liquid crystal medium between the electrodes, and a reflecting layer provided on the reverse side of the element and capable of transmitting electric wave. The reflecting layer may be composed of a layer of a white pigment such as titanium oxide or a plate of plastics such as white polyethylene terephthalate. The display unit 3 has a display area which is substantially equal to the area of the coordinate input region of the tablet 1 and is superposed on the tablet 1 in such a manner that the coordinates positions on the display unit 3 correspond to the coordinate positions on the tablet 1.

FIG. 4 shows the detail of the position detection circuit 4, together with the tuning circuit 25. The position detection circuit 4 has a control means or circuit 401, selection means or circuits 402x, 402y, and transmission/receiving change-over means or circuits 403x, 403y. The position detection circuit 4 further includes a timing circuit 404, an x-y change-over circuit 405 and driving circuits 406x, 406y, which in combination constitute transmission/receiving means. The position detection circuit 4 further has receiving means constituted by amplifiers 407x, 407y, a receiving timing change-over circuit 408, a band-pass filter (BPF) 409, a detector 410, phase detectors (PSD) 411, 412, and low-pass filters 413, 414 and 415.

Figure 5:
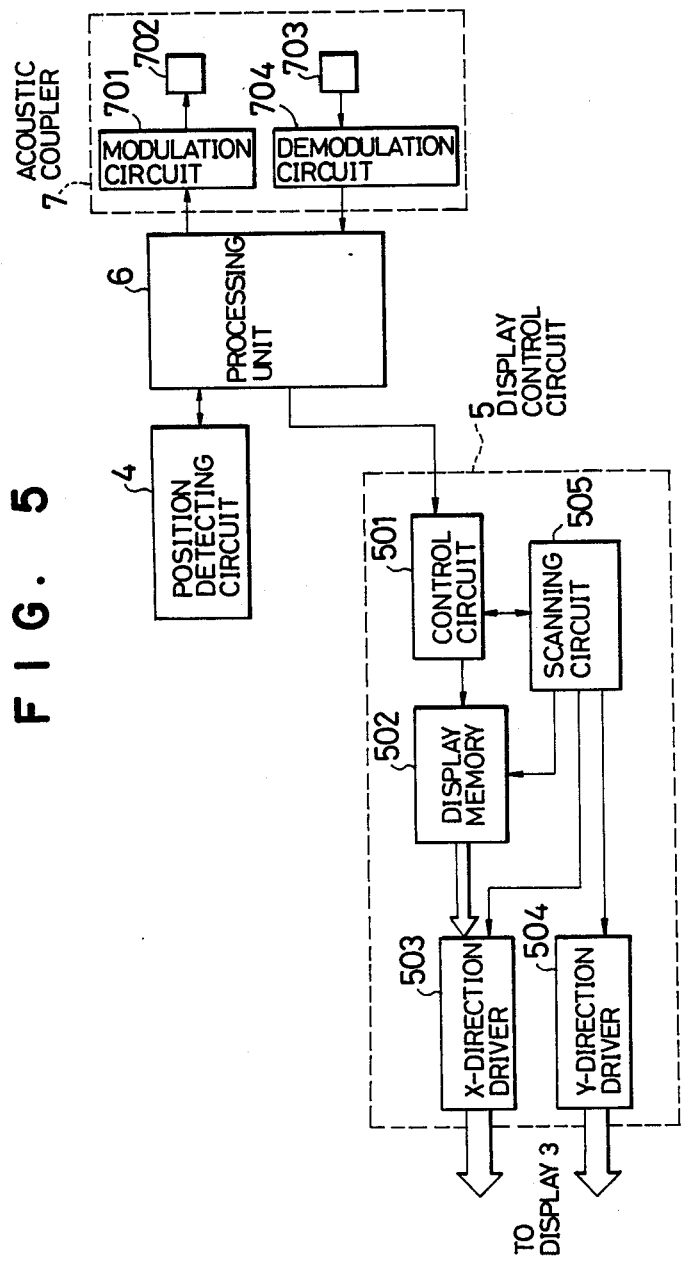
FIG. 5 is an illustration of a display control circuit and an acoustic coupler.

FIG. 5 shows the detail of the display control circuit 5 and an acoustic coupler 7. The display circuit 5 has a control circuit 501, a display memory 502, an X-direction driver 503, a Y-direction driver 504, and a scanning circuit 505. The acoustic coupler 7 has a modulation circuit 701, a speaker 702, a microphone 703 and a demodulating circuit 704.

Figure 6:
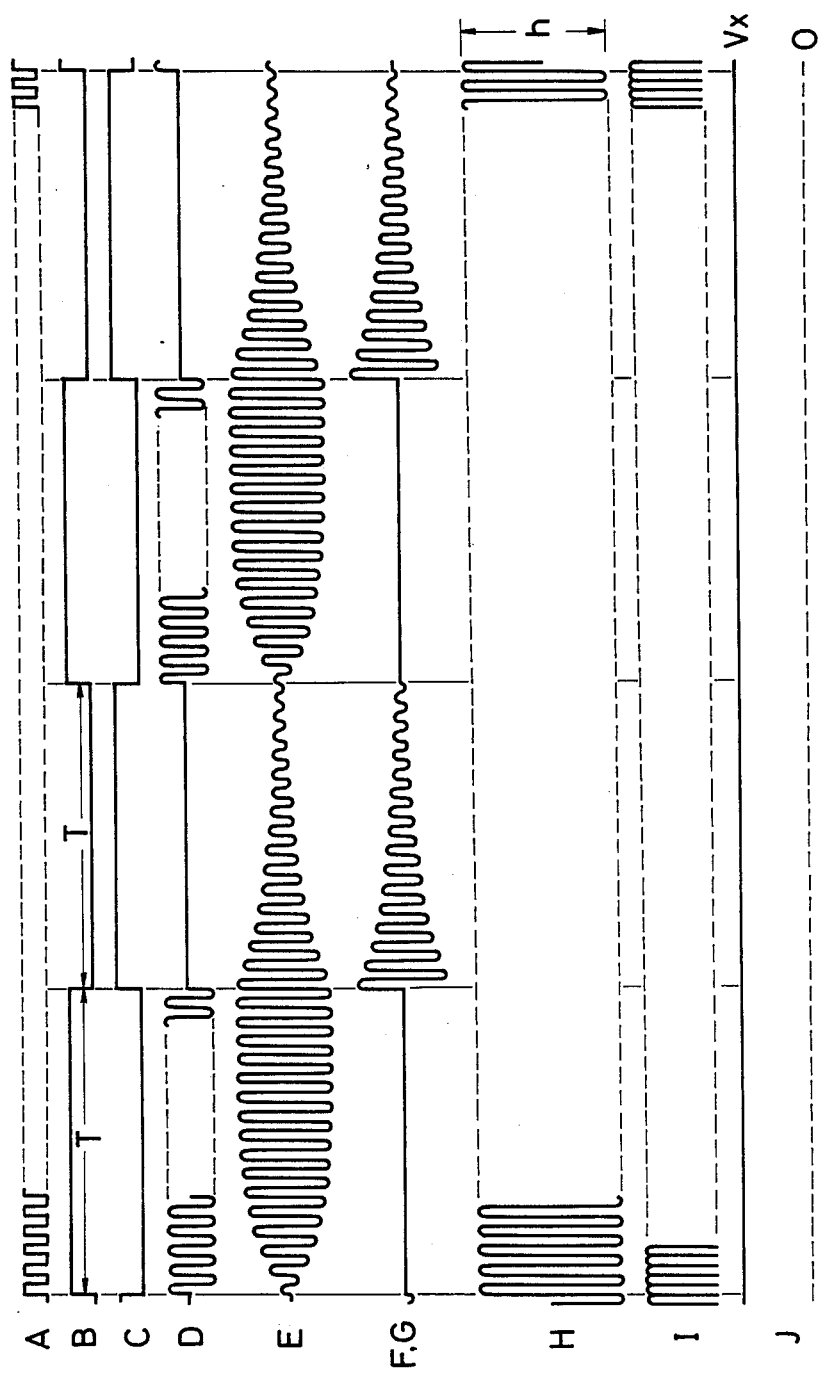
FIG. 6 is a waveform chart illustrating the waveforms of various signals available at various parts of the arrangement shown in FIG. 4.

The operation of this embodiment will be described hereinunder. The description will be first commenced with the description of the manner in which an electric wave is exchanged between the tablet 1 and the pen 2, as well as the signal which is obtained as a result of the signal exchange, with reference to FIG. 6.

The control circuit 401 is constituted by a microprocessor which is known per se or an equivalent device. The control circuit 401 is designed to perform various controls such as the control of the timing circuit 404, control of the selection circuits 402x, 402y to enable them to switch-over the respective loop coils on the tablet 1, and control of the X-Y change-over circuit 405 and the receiving timing change-over circuit 408 for changing-over the direction in which the position is to be detected. The control circuit 401 also performs an analog-to-digital (A/D) conversion of the output values from the low-pass filters 413 to 415 and a later-mentioned arithmetic operation to compute the coordinate values of the position appointed by the pen 2. The control circuit 401 further discriminates the states of the switches and conducts various processings in accordance with the detected states of the switches.

The selection circuit 402x is designed to successively select one from the multiplicity of X-direction loop coils 11-1, 11-2, . . ., 11-48, while the selection circuit 402y successively selects one from the multiplicity of Y-direction loop coils 12-1, 12-2, . . ., 12-48.

These selection circuits 402x, 402y are adapted to operate in accordance with the information from a control circuit 401.

The transmission/receiving change-over circuit 403x is designed to connect one of the X-direction loop coils selected by the selection circuit 402x alternately to the driving circuit 406x and the amplifier 407x. Similarly, the transmission/receiving change-over circuit 403y is designed to connect one of the Y-direction loop coils selected by the selection circuit 402y alternately to the driving circuit 406y and the amplifier 407y. These transmission/receiving change-over circuits 403x, 403y operate in accordance with a later-mentioned transmission/-receiving change-over signal.

The timing circuit 404 produces various signals including a rectangular wave signal A having a predetermined frequency f0, e.g., 500 kHz, a signal A' (not shown) which is formed by delaying the rectangular wave signal A by a predetermined phase, a transmission/receiving change-over signal B of a predetermined frequency, e.g., 15.625 kHz, and a receiving timing signal C. The rectangular wave signal A is on one hand delivered to the phase detection circuit 411 and on the other hand converted into a sine wave signal through a low-pass filter which is not shown. In addition, the rectangular wave signal A is transmitted to either one of the driving circuits 406x and 406y through the X-Y change-over circuit 405. On the other hand, the delayed rectangular wave signal A' is delivered to the phase detection circuit 412, while the transmission/receiving change-over signal B is delivered to the transmission/-receiving change-over circuits 403x, 403y. The receiving timing signal C is supplied to the receiving timing change-over circuit 408.

It is assumed here that the control circuit 401 is delivering a signal for selecting the X-direction to the X-Y change-over circuit 405 and the receiving timing change-over circuit 408. In such a case, the sine wave signal is delivered to the driving circuit 406x so as to be converted into an equilibrium or balance signal which is then delivered to the transmission/receiving change-over circuit 403x. The transmission/receiving change-over circuit 403x operates in accordance with the transmission/receiving change-over signal B so as to connect either one of the driving circuit 406x and the amplifier 407x. Therefore, the signal which is delivered by the transmission/receiving change-over circuit 403x to the selection circuit 402x is changed to a signal D which intermittently forms pulses of 500 kHz at a predetermined time interval T ($=\frac{1}{2}$ fk) which is in this case 32$\mu$sec.

The signal D is input through the selection circuit 402x to one of the loop coils 11-i (i =1, 2, . . ., 48) in the X-direction position detecting portion 11 of the tablet 1, so that the loop coil 11-i produces an electric wave corresponding to the signal D.

It is also assumed here that the pen 2 is held in the vicinity of the loop coil 11-i of the tablet 1 so as to face the tablet 1 across the display unit 3 substantially perpendicularly to the tablet 1, i.e., in the state of use. In such a case, the electric wave excites the coil 252 of the pen 2 so that an induction voltage E synchronous with the signal D is generated in the tuning circuit 25.

In the period in which the signal D has no pulse, i.e., in the period for receiving a signal, the loop coil 11-i is switched to be connected to the amplifier 407x, so that the electric wave from the loop coil 11-i is extinguished without delay, while the induction voltage E is progressively attenuated due to loss of energy in the tuning circuit 25

Meanwhile, the electric current flowing in the tuning circuit 25 in accordance with the induction voltage E produces an electric wave which is transmitted from the coil 252. This electric wave excited the loop coil 11-i connected to the amplifier 407x so that a voltage is induced in the loop coil 11-i corresponding to the electric wave from the coil 252. The induction voltage is delivered to the amplifier 407x through the transmission/receiving change-over circuit 403x only during the period for receiving, and forms a reception signal F. The reception signal F is delivered to a receiving timing change-over circuit 408.

The receiving timing change-over circuit 408 receives either one of the signal for selecting the X-direction and the signal for selecting the Y-direction. In this case, the signal for selecting the X-direction is received together with the receiving timing signal C which is formed b inverting the transmission/receiving change-over signal B. The receiving timing change-over circuit 408 delivers the reception signal F when the level of the signal C is high (H) but does not produce any signal when the level of the signal C is low (L), whereby a signal G which is materially the same as the reception signal F is obtained.

The signal G is delivered to the band-pass filter 409 which is a filter having a central frequency f0 so that it passes a signal H having an amplitude h corresponding to the energy of a frequency component f0 of the above-mentioned signal G to the detector 410 and the phase detectors 411, 412. Actually, several pulses of the signal G input to the filter 409 and converged by the filter are delivered to the detector 410 and the phase detectors 411, 412.

The signal H input to the detector 410 is detected and rectified to become a signal I which is input to the low-pass filter 413 having a sufficiently low cut-off frequency so as to be changed into a D.C. signal J having a voltage value Vx which substantially corresponds to $\frac{1}{2}$ the amplitude h mentioned before. The thus formed D.C. signal J is delivered to the control circuit 401.

The voltage value Vx of the aforementioned signal J has a value which is proportional to the distance between the pen 2 and the loop coil 11-i and is changed in response to the change-over of the loop coil 11-i. The control circuit 401 operates to change the voltage value Vx derived from each loop coil into a corresponding digital value and then conducts an arithmetic operation on the thus obtained digital values thereby to compute the position appointed by the pen 2 in the X-direction. Similarly, the coordinate value of the position in the Y-direction also is computed in the same manner.

On the other hand, the phase detector 411 receives the rectangular wave signal A mentioned before. Therefore, if the switch 251 has been turned off and the phase of the signal H substantially coincides with the phase of the rectangular wave signal A, the phase detector 411 delivers a signal obtained by inverting the signal H to the positive side, i.e., a signal materially the same as the signal I. This signal is converted by the low-pass filter 414 similar to that described before into a D.C. signal (substantially the same as the signal J) having a voltage value substantially corresponding to $\frac{1}{2}$ the amplitude h, and this signal is delivered to the control circuit 401. The phase detector 412 receives the rectangular wave signal A' as the detection signal. If the switch 251 has been turned off as described before while the phase of the signal H is in advance of the phase of the rectangular wave signal A' by a predetermined angle, the phase detector 412 delivers a signal which has both positive and negative components. This signal is converted into D.C. signal by the low-pass filter 415 and is delivered to a control circuit 401. Since the output signal from the phase detection circuit 412 has both the positive and negative components, the voltage value of the output from the low-pass filter 415 is considerably small as compared with the value of the voltage which is obtained through the low-pass filter 414. As the switch 251 of the pen 2 is turned on in this state, the phase of the electric current flowing in the tuning circuit 25 is delayed from the induction voltage E so that the phase of the reception signal F also is delayed by a predetermined angle. Namely, the phase of the reception signal F becomes substantially the same as the phase of the rectangular wave signal A'.

As a result, the output H from the band-pass filter 409 is changed by the phase detector 411 into a signal having both the positive and negative components. At the same time, the voltage of the output from the low-pass filter 414 becomes substantially the same as that of the output from the low-pass filter 415 as obtained when the aforementioned switch 251 has been turned off. This signal, however, has been inverted to the positive side by the phase detector 412. On the other hand, the low-pass filter 415 delivers an output which is a D.C. signal having a voltage value substantially corresponding to $\frac{1}{2}$ that of the amplitude h as explained before.

In consequence, the low-pass filter 414 produces an output of a predetermined voltage value when the switch 251 has been turned off, whereas, when the switch 251 has been turned on, a predetermined voltage value is obtained at the output of the low-pass filter 415. The control circuit 401 therefore can discriminate the state of the switch 251, i.e., whether this switch is on or off, through checking the output values from the low-pass filters 414 and 415.

The information indicating the on or off state of the switch 251 discriminated as explained above is used, for example, as the information which appoint the values to be actually input, among a plurality of pieces of coordinates values concerning the position appointment. A description will be given hereinunder as to the position detecting operation in the position detection circuit 4 and the state of the pen 2, with specific reference to FIGS. 7 to 9. The detail of discrimination of the state of the switch 251, as well as the operation of the whole apparatus, will be understood from the following description. When a position detecting instruction is given by the processing device 6 to the position detection circuit 4, the control circuit 401 delivers a signal for selecting the X-direction to the X-Y change-over circuit 405 and the receiving timing change-over circuit 408. At the same time, the control circuit 401 delivers to the selection circuit 402x an information for enabling the selection circuit 402x to select the first loop coil 11-1 from among the loop coils 11-1 to 11-48 of the tablet 1, and connects this loop coil 11-1 to the transmission/-receiving change-over circuit 403x.

The transmission/receiving change-over circuit 403x operates to conduct a change-over to connect the loop coil 11-1 alternately to the driving circuit 406x and the amplifier 407x in accordance with the transmission/-receiving change-over signal B mentioned before. Meanwhile, the driving circuit 406x delivers 16 pieces of sine wave signal of 500 kHz in the transmitting period of 32μsec, as shown in FIG. 7(a).

The change-over between the transmission and the receiving is repeated seven times for each loop coil, i.e., the loop coil 11-1 under description, as shown in FIG. 7(b). The total period of seven cycles of transmission and receiving corresponds to the period of selection of the single loop coil which is 448μsec.

In this state, the amplifier 407x produces an induction voltage in each of the seven receiving periods for each of the loop coils. The induction voltages thus obtained are input through the receiving timing change-over circuit 408 to the band-pass filter 409 so as to be averaged by the latter, and is delivered to the control circuit 401 through the detector 410, phase detectors 411, 412 and the low-pass filters 413 to 415. The output value derived from the low-pass filter 413 is temporarily stored as the detection voltage, e.g., the voltage V×1 which is proportional to the distance between the pen 2 and the loop coil 11-1. (Actually, the analog values of the outputs from the low-pass filters 414 and 415 also are converted into digital values but these digital values are not adopted.)

Subsequently, the control circuit 401 delivers to the selection circuit 402x an information for enabling the selection circuit 402x to select the next loop coil 11-2 so that the loop coil 11-2 is connected to the transmission/-receiving change-over circuit 403x thereby obtaining a detection voltage V×2 proportional to the distance between the pen 2 and the loop coil 11-2. The control circuit 401 then stores this detection voltage V×2. Similarly, the successive loop coils 11-3 to 11-48 are connected to the transmission/receiving change-over circuit 403x so that detection voltages V×1 to V×48 proportional to the distances between the pen 2 and the respective loop coils are stored. In FIG. 7(c), however, only part of these detection voltages are shown in an analog manner.

The detection voltages are actually obtainable only from several loop coils on both sides of the position (xp) where the pen is located, as will be seen from FIG. 8.

Subsequently, the control circuit 401 supplies both the X-Y change-over circuit 405 and the receiving timing change-over circuit 408 with a signal for selecting the Y-direction, thereby operating the selection circuit 402y and the transmission/receiving change-over circuit 403y in the same manner as that described before so as to successively select the loop coils 12-1 to 12-48. In consequence, detection voltages obtained through an A/D conversion of the outputs from the low-pass filter 413, corresponding to the distances between the pen 2 and the respective loop coils 12-1 to 12-48, are temporarily stored in the control circuit 401. The control circuit 401 then computes the coordinate values corresponding to the position of the pen 2 in the Y-direction.

Subsequently, the control circuit 401 delivers to the selection circuit 402x (or 402y) for selecting the loop coil 11-i (or 12-i) which has delivered the highest detection voltage from among the loop coils 11-1 to 11-48 in the X-direction (or loop coils 12-1 to 12-48 in the Y-direction). The control circuit 401 then repeats the transmission and receipt of the electric wave a plurality of times, e.g., seven times, and conducts A/D conversion of the output values derived from the low-pass filters 414 and 415. The control circuit 401 then determines which one of the outputs from the low-pass filter 414 and the low-pass filter 415 is greater than a predetermined value thus discriminating the state, i.e., on or off, of the switch 251.

The result of discrimination of the state of the switch 251 is delivered to the processing device 6 together with the coordinate values corresponding to the position of the pen 2 in X- and Y-directions.

When the first cycle of position detection and state discrimination is finished as described, the control circuit 401 commences a second and subsequent position detecting operation. Namely, the control circuit 401 delivers to the selection circuit 402x information for selecting a predetermined number of loop coils, e.g., 10 coils, on each side of the loop coil which has delivered the greatest detection voltage from among the X-direction loop coils 11-1 to 11-48. Similarly, the control circuit 401 delivers to the selection circuit 402y information for selecting a predetermined number of loop coils, e.g., 10 coils, on each side of the loop coil which has delivered the greatest detection voltage from among the Y-direction loop coils 12-1 to 12-48. Then, the detection of the position of the pen 2 both in the X- and Y-directions and the discrimination of the on-off state of the switch 251 are conducted in the same manner as that described before, and the thus obtained coordinate values and the result of the discrimination are transferred to the processing device 6 to renew the data. The control circuit 401 then repeats this operation.

The term "level check" appearing in FIG. 9 is used to mean an operation for checking whether the greatest value of the detection voltage has reached the aforementioned detection level and to check which one of the loop coils has delivered the greatest value. If the detection level has not been reached, subsequent computation of the coordinates values is ceased and an operation is conducted to set the center of the group of loop coils which are to be selected in the next cycle of operation for detecting the position and discriminating the state of operation.

A method for determining the coordinate value in the X- or Y-direction, e.g., the aforementioned coordinates value xp, is to employ a suitable function which approximates the waveform near the maximum value of the detection voltages V×1 to V×48 and to determine the coordinates value of the maximum value of this function.

For instance, referring to FIG. 7(c), a curve section corresponding to the maximum value of the detection voltage Vx3 can be approximated by a quadratic functions. Using these quadratic functions, the coordinates value can be determined as follows.

$$V \times 2 = a(x2 - xp)^2 + b \tag{1}$$

$$V \times 3 = a(x3 - xp)^2 + b \tag{2}$$

$$V \times 4 = a(x4 - xp)^2 + b \qquad (3)$$

where, the coordinates values of the centers of the loop coils 11-1 to 11-48 are represented by x1 to x48, respectively, while the pitch is represented by $\Delta x$.

In these formulae, symbols a and b represent, respectively, constant which meet the condition of ($a<0$).

At the same time, the following conditions are met:

$$x3 - x2 = \Delta x \qquad (4)$$

$$X4 - x2 = 2\Delta x \qquad (5)$$

The following formula (6) is obtained by substituting the formulae (4) and (5) into the formulae (2) and (3):

$$xp = x2 + \Delta x/2(3Vx2 - 4Vx3 + Vx4)/(Vx2 - 2Vx3 + V \times 4) \qquad (6)$$

It is therefore possible to determine the coordinates value xp corresponding to the position of the pen 2 by extracting the greatest detection voltage and the detection voltages derived from loop coils on both sides of the loop coil providing the greatest voltage from among the detection voltages $V \times 1$ to $V \times 48$, and conducting the computation of the formula (6) using the values of these detection voltages and the coordinates value (known) of the loop coil which is immediately before the loop coil which had given the greatest voltage.

Among the coordinates values of the position appointed both in X- and Y-directions, the values which have been delivered to the processing device 6 together with the result of discrimination of the state of the switch 251 are stored in a memory which is not shown, and is delivered to display memory 502 in the display control circuit 5. These values are put in a predetermined order and stored in the display memory. The stored values are sequentially read in accordance with the timing pulses from the control circuit 501 and are delivered to the X-direction driver 503. The X-direction driver 503 and the Y-direction driver 504 receive scanning pulses which are generated by a scanning circuit 505 in synchronization with the timing pulses from the control circuit 501, and the drivers 503 and 504 drive the electrodes corresponding to the coordinate values of the appointed position on the display unit 3 both in the X- and Y-directions, thereby displaying the appointed position at the same point on the display unit 3 as the point on the tablet 1 which has been appointed by the pen 2.

In consequence, letters or patterns drawn by the locus of the pen 2 which has been kept in an on state and moved on the display unit 3 superposed on the tablet 1 are displayed by bright lines on the display unit 3.

On the other hand, the coordinates values of the appointed position in X- and Y-directions stored in the processing device 6 and other data formed on the basis of these coordinates values are delivered to the modulation circuit 701 of the acoustic coupler 7 so as to be modulated into signals of an acoustic band and are converted into acoustic signals through a speaker 702 so as to be sent to the opposite station through a telephone 8 and a telephone network 9. If the opposite station has the same coordinates input apparatus as that of the described embodiment, the letters and patterns are displayed on the display unit of the opposite station. On the other hand, coordinates values and data transmitted from the opposite station are input to the processing device 6 through the microphone 703 and the demodulating circuit 704 and are temporarily stored in the latter. The thus stored coordinates values and the data are then displayed on the display unit 3 through the display control circuit 5 in the same manner as that described before.

The processing device 6 may be designed to have an editing function for editing letters and/or a pattern processing function for processing patterns. In such a case, the letters and patterns input through the tablet 1 can be corrected, added or deleted as desired and the result of such an editorian or pattern-processing operation can be displayed simultaneously on the display unit 3 of the coordinates input apparatus of this station and on the display unit 3 of the opposite station.

The arrangement may be such that the tablet 1 or another portion of the apparatus is provided with a microphone, while the processing device 6 is equipped with an acoustic recognition function, so that various commands can be input by means of voice. It is also possible to provide the processing device 6 with a letter recognition function so as to be used as a letter recognition apparatus.

It is not always necessary that the area of the input region of the tablet 1 and the display area of the display unit 3 are equal. Namely, the size of the input region of the tablet 1 may be smaller or greater than the size of the display area of the display unit 3. In addition, it is not essential that the display unit 3 is superposed on the tablet 1.

The numbers of the loop coils employed in the described embodiment, as well as the manner in which these loop coils are arranged, are only illustrative and may be varied as desired.

What is claimed is:

1. A coordinates input apparatus comprising:
   a tablet including an X-position detecting portion having a multiplicity of loop coils arranged in parallel so as to extend in X-direction and a Y-position detecting portion having a multiplicity of coils arranged in parallel so as to extend in Y-direction, said X-position detecting portion and said Y-position detecting portion being superposed one on the other;
   a display unit;
   a position appointing device having a tuning circuit including a coil and capacitors so as to make resonance at a predetermined frequency;
   a position detecting circuit including X- and Y-direction selection means for successively selecting one from the X-direction loop coils and Y-direction loop coils, transmission means for driving, with an A.C. signal of said predetermined frequency, the selected X- and Y-direction loop coils, receiving means for detecting from among a plurality of voltages induced in the selected X-direction and Y-direction loop coils an induction voltage of a frequency substantially the same as said predetermined frequency, X- and Y-transmission/receiving change-over means for connecting each of the selected X- and Y-direction loop coils alternately to said transmission means and said receiving means, and control means for determining, from said induction voltages induced in said X- and Y-direction loop coils, the position appointed by said position appointing device in X- and Y-directions;
   a display control circuit for driving said display unit; and a modulation/demodulation circuit for converting data such as coordinates values of said appointed position and transmitting the converted data through a transmission line and for conducting an inverse conversion of the signals transmitted through said transmission line.

2. A coordinates input apparatus according to claim 1, wherein the size of the input region of said tablet and the size of the display area of said display unit are equal and said display is superposed on said tablet.

3. A coordinates input apparatus according to claim 1, wherein the size of the display area of said display unit is smaller than the size of the input region of said tablet and said display unit is superposed on a portion of said tablet outside said input region.

* * * * *

UNITED STATES PATENT AND TRADEMARK OFFICE
CERTIFICATE OF CORRECTION

PATENT NO. : 4,848,496
DATED : July 18, 1989
INVENTOR(S) : Azuma Murakami, et al.

It is certified that error appears in the above-identified patent and that said Letters Patent is hereby corrected as shown below:

Column 1, line 8, change "in putting" to --inputting--.

Column 7, line 34, change "b" to --by--.

Column 10, bridging lines 62 and 63, change "functions" to --function--.

Column 11, in Equation 5, change "X4" to --x4--.

Column 11, in Equation 6, add brackets as follows:

xp = x2 + Δx/2 { (3Vx2 - 4Vx3 + Vx4)/(Vx2 - 2Vx3 + Vx4) }

Column 11, line 35, after "to" insert --a--.

Signed and Sealed this

Sixth Day of November, 1990

*Attest:*

HARRY F. MANBECK, JR.

*Attesting Officer*      *Commissioner of Patents and Trademarks*